US009476907B2

(12) United States Patent
Malvern et al.

(10) Patent No.: US 9,476,907 B2
(45) Date of Patent: Oct. 25, 2016

(54) VARIABLE CAPACITANCE ACCELEROMETER WITH MEANDERING FLEXURES

(71) Applicant: Atlantic Inertial Systems Limited, Plymouth (GB)

(72) Inventors: Alan Malvern, Plymouth (GB); Louise Snell, Tavistock (GB); Steven Westbury, Plymouth (GB)

(73) Assignee: Atlantic Inertial Systems Limited, Devon (GB)

( * ) Notice: Subject to any disclaimer, the term of this patent is extended or adjusted under 35 U.S.C. 154(b) by 285 days.

(21) Appl. No.: 14/349,942

(22) PCT Filed: Oct. 2, 2012

(86) PCT No.: PCT/GB2012/052436
§ 371 (c)(1),
(2) Date: Apr. 4, 2014

(87) PCT Pub. No.: WO2013/050752
PCT Pub. Date: Apr. 11, 2013

(65) Prior Publication Data
US 2014/0305211 A1  Oct. 16, 2014

(30) Foreign Application Priority Data
Oct. 5, 2011  (GB) .................................. 1117164.2

(51) Int. Cl.
*G01P 15/135* (2006.01)
*G01P 15/125* (2006.01)
*G01P 15/08* (2006.01)

(52) U.S. Cl.
CPC ........... *G01P 15/135* (2013.01); *G01P 15/125* (2013.01); *G01P 2015/0857* (2013.01)

(58) Field of Classification Search
CPC ...................................................... G01P 15/125
USPC ......................................................... 73/514.36
See application file for complete search history.

(56) References Cited

U.S. PATENT DOCUMENTS 6,360,605 B1    3/2002  Pinter et al.
7,013,730 B2 *  3/2006  Malametz ............... G01P 15/08
                                                        248/628

(Continued)

FOREIGN PATENT DOCUMENTS

CN     102128953     7/2011
JP        923015     1/1997

(Continued)

OTHER PUBLICATIONS

International Search Report dated Feb. 15, 2013 in PCT Application No. PCT/GB2012/052436.

(Continued)

*Primary Examiner* — Hezron E Williams
*Assistant Examiner* — Mark A Shabman
(74) *Attorney, Agent, or Firm* — Snell & Wilmer, L.L.P.

(57) ABSTRACT

An accelerometer comprises a support (12), a proof mass (14) supported for movement relative to the support (12) by a plurality of mounting legs (16), a plurality of fixed capacitor fingers associated with the support (12) and a plurality of movable capacitor fingers associated with the proof mass (14), the fixed capacitor fingers being interdigitated with the movable capacitor fingers, the mounting legs (16) being of serpentine shape, each mounting leg (16) comprising at least a first generally straight section (16a), a second generally straight section (16a), and an end section (16b) of generally U-shaped form interconnecting the first and second generally straight sections (16a), wherein the thickness Te of the end section (16b) is greater than the thickness Tc of a central part (16c) of both of the first and second generally straight sections (16a).

17 Claims, 3 Drawing Sheets

(56) References Cited

U.S. PATENT DOCUMENTS

| | | | |
|---|---|---|---|
| 2002/0011107 A1* | 1/2002 | Sakai | G01P 15/0802 73/514.32 |
| 2003/0010123 A1* | 1/2003 | Malvern | G01P 15/0802 73/514.32 |
| 2005/0126287 A1* | 6/2005 | Malametz | G01P 15/08 73/504.12 |
| 2005/0204816 A1 | 9/2005 | Tokunaga | |
| 2007/0029629 A1* | 2/2007 | Yazdi | B81C 1/00253 257/414 |
| 2007/0144258 A1 | 6/2007 | Chu | |
| 2010/0071468 A1* | 3/2010 | Ohuchi | G01C 19/5719 73/504.12 |

FOREIGN PATENT DOCUMENTS

| | | |
|---|---|---|
| JP | 200166321 | 3/2001 |
| JP | 201089254 | 4/2010 |
| WO | 03054477 | 7/2003 |
| WO | 2007021399 | 2/2007 |
| WO | 2010125070 | 11/2010 |

OTHER PUBLICATIONS

Search Report dated Dec. 12, 2011 in GB Application No. GB1117164.2.

Office Action dated Aug. 2, 2016 in Japanese Application No. 2014-533982.

\* cited by examiner

VARIABLE CAPACITANCE ACCELEROMETER WITH MEANDERING FLEXURES

CROSS-REFERENCE TO RELATED APPLICATIONS

This application is U.S. national phase filing under 35 U.S.C. §371 of PCT/GB2012/052436 filed on Oct. 2, 2012, and claims priority from United Kingdom Application No. GB 1117164.2 which was filed on Oct. 5, 2011, both of which are incorporated herein by reference.

This invention relates to an accelerometer, and in particular to a micro-electromechanical (MEMS) accelerometer of relatively small dimensions and low cost.

MEMS accelerometers are in widespread use, for example in automotive and other applications. One area in which they are used is in global positioning applications, to provide back-up information indicative of the movement of a vehicle for use during short intervals in which satellite communications links are temporarily interrupted. However, it will be appreciated that this is merely one possible application in which a MEMS accelerometer may be used, and that the invention is not restricted in this regard.

U.S. Pat. No. 7,047,808 describes a MEMS accelerometer suitable for use in such applications. The accelerometer comprises a proof mass of plate-like form surrounded by a ring-like support member. The support member and the proof mass are substantially coplanar, and the proof mass is connected to the support member by means of a series of straight mounting legs that are formed integrally with the mass and the support member. Each leg extends in a direction substantially perpendicular to a direction in which the accelerometer is sensitive to accelerations. In use, the accelerometer is mounted upon an object, the motion of which is to be monitored, the accelerometer being mounted in such a manner that the support member is rigidly secured to the object, the accelerometer being correctly orientated such that the mounting legs each extend in a direction substantially perpendicular to the sensing direction. If the object is accelerated in the sensing direction, it will be appreciated that the inertia of the proof mass will result in the proof mass moving relative to the support member, the mounting legs flexing and applying a restoring force urging the proof mass back towards its rest position.

In order to permit relative movement between the proof mass and the support member to be sensed and thereby permit the production of an electrical output indicative of the acceleration, the proof mass is provided with several groups of capacitor fingers, each of which extends substantially parallel to the mounting legs. Similarly, the support member is provided with several groups of capacitor fingers, the fingers of each group being interdigitated with the capacitor fingers of a corresponding group associated with the proof mass. Movement of the proof mass relative to the support member results in relative movement of adjacent ones of the interdigitated fingers. By taking appropriate capacitance measurements, the position or movement of the proof mass relative to the support member can be determined. As the movement of the proof mass relative to the support member arises in use from the object to which the accelerometer is mounted experiencing an acceleration, it will be appreciated that the movement output is also indicative of the experienced acceleration.

Other, similar devices are described in, for example, U.S. Pat. Nos. 7,562,573 and 7,267,006.

In order to accommodate devices of this general type in a limited spaced, the mounting legs are typically of relatively short form and so, for a given thickness, are relatively stiff, and the distance through which the proof mass moves is small. The shortness of the mounting legs results in the device typically being of high resonant frequency. Whilst in some applications the relatively high resonant frequency is acceptable, there is a desire to provide accelerometer devices of lower resonant frequency but without significantly increasing the overall dimensions of the device. By reducing the resonant frequency in the plane in which the device is sensitive to accelerations (in-plane resonant frequency), the sensitivity of the device can be enhanced, and noise can be reduced. By reducing the resonant frequency in a direction perpendicular to the plane in which the device is sensitive to accelerations (out-of-place resonant frequency), it becomes possible to use the glass substrates to either side of the proof mass as bump stops, reducing the risk of damage to the device in the event of the application of a large out-of-plane acceleration thereto.

The resonant frequency could be reduced by increasing the lengths of the legs, but this would result in the device being of increased dimensions. In many applications, the increase in size would be unacceptable.

One way in which the lengths of the mounting legs can be increased without significantly increasing the overall dimensions of the device is to incorporate mounting legs of, for example, a serpentine form. U.S. Pat. No. 7,013,730 describes an accelerometer device in which mounting legs of serpentine form are provided.

Whilst increasing the lengths of the mounting legs by the use of serpentine shaped legs can achieve the desired reductions in resonant frequency, it has been found that the mounting legs are susceptible to damage when the device is exposed to large out-of-plane accelerations. It is an object of the invention to provide an accelerometer in which at least some of the disadvantages outlined hereinbefore are overcome or are of reduced effect.

According to the present invention there is provided an accelerometer comprising a support, a proof mass supported for movement relative to the support by a plurality of mounting legs, a plurality of fixed capacitor fingers associated with the support and a plurality of movable capacitor fingers associated with the proof mass, the fixed capacitor fingers being interdigitated with the movable capacitor fingers, the mounting legs being of serpentine shape, each mounting leg comprising at least a first generally straight section, a second generally straight section, and an end section of generally U-shaped form interconnecting the first and second generally straight sections, wherein the thickness of the end section is greater than the thickness of a central part of both of the first and second generally straight sections.

It has been found that, where an accelerometer has mounting legs of serpentine form, the parts thereof which are most highly stressed, in the event of a significant out-of-plane acceleration being applied thereto, are the end sections. By increasing the thickness of such sections relative to the thickness of other parts of the mounting legs, the risk of failure thereof can be reduced without unacceptably reducing the sensitivity of the device.

The maximum thickness of the end section is preferably at least twice the thickness of the central parts. More preferably, it is at least 2.5 times, and preferably less than 4 times, the thickness of the central parts. Conveniently, it is about 3 times the thickness of the central parts. Such a thickness is thought to provide a good trade-off between increasing thickness to reduce the risk of failure and avoiding the use of such a great thickness that sensitivity and size are undesirably impacted.

Conveniently, each straight section includes a tapering part at each end thereof. As a result, a smooth transition between the thickness of the generally straight sections and that of the end section can be achieved. Such a smooth transition reduces the formation of stress concentrations and so reduces the risk of failure of the mounting legs.

The thickness of the central part of the first generally straight section is conveniently different to that of the central part of the second generally straight section. It has been found that the straight sections are not exposed to the same levels of stress, in use, and so by tuning the thickness of the generally straight sections to the stresses to which they are subject in use, further enhancements to the operation and reductions in the risk of failure can be made.

Conveniently, each leg includes five generally straight sections. It will be appreciated that this need not always be the case and that, for example, arrangements having more (such as seven) or fewer generally straight sections are possible. In order to accommodate the mounting legs of serpentine form without increasing the dimensions of the device it may be necessary to reduce the number of capacitor fingers compared to an arrangement having more typical straight mounting legs. Depending upon the application in which the device is to be used, a reduction in capacitor fingers to accommodate serpentine legs having more straight sections may be acceptable. In other applications, it may not be acceptable to significantly reduce the number of capacitor fingers and so mounting legs with only a small number of generally straight sections may be required if increasing the dimensions of the device is to be avoided.

Preferably, the central part of each generally straight section is of uniform thickness. The central part conveniently forms at least 50% of the length of each generally straight section. More preferably, it forms at least 65%, and preferably less than 85%, of the length of each generally straight section.

The proof mass conveniently comprises a first proof mass element and a second proof mass element, the first and second proof mass elements being rigidly interconnected by a connecting member, and wherein the fixed capacitor fingers are located between the first and second proof mass elements. Such an arrangement is advantageous in that the number of electrical connections which must be made, and consequently the space taken up by the provision of the electrical connections, can be reduced.

The invention will further be described, by way of example, with reference to the accompanying drawings, in which.

Figure 1:
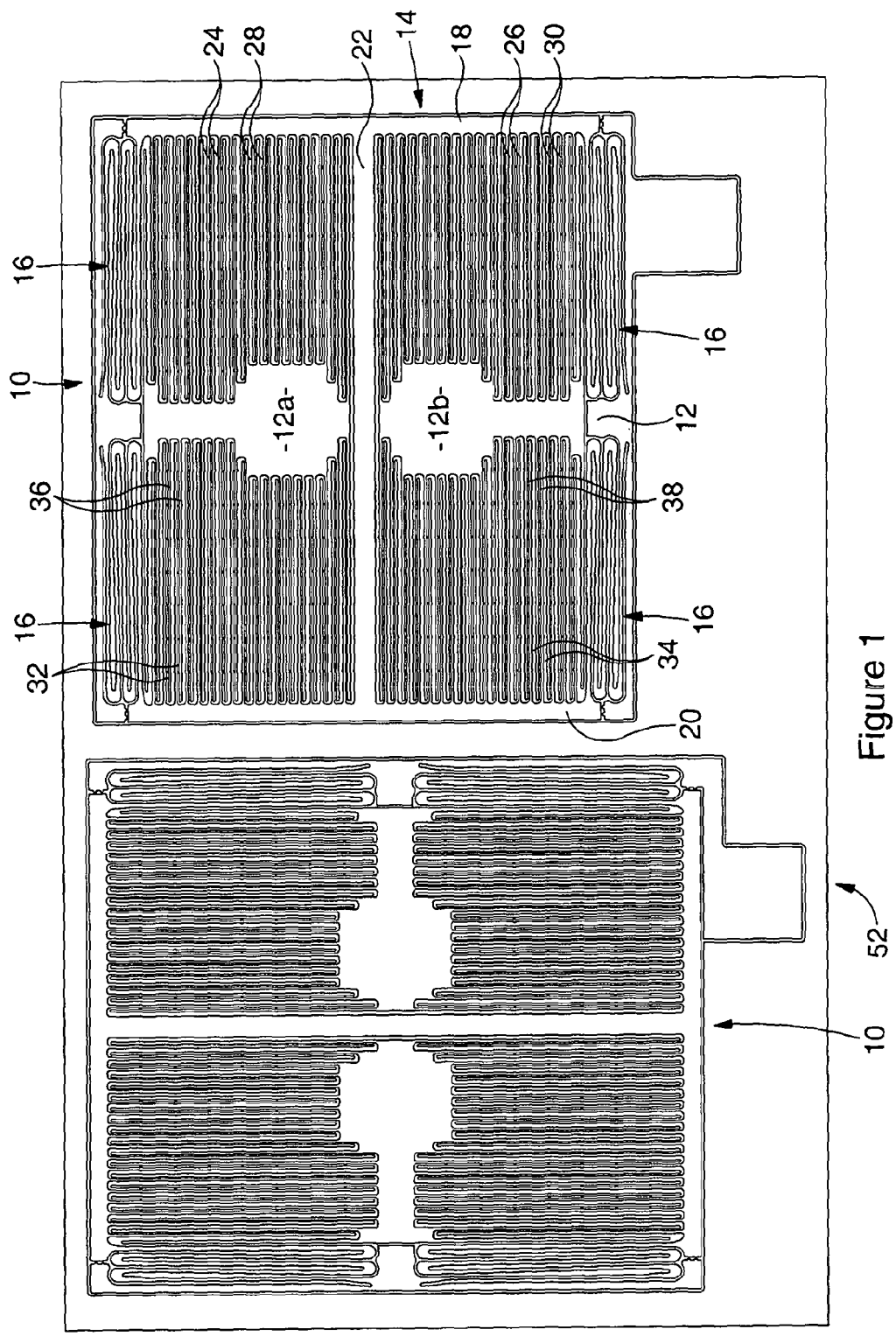
FIG. 1 is a plan view illustrating part of an accelerometer in accordance with one embodiment of the invention.
Figure 1A:
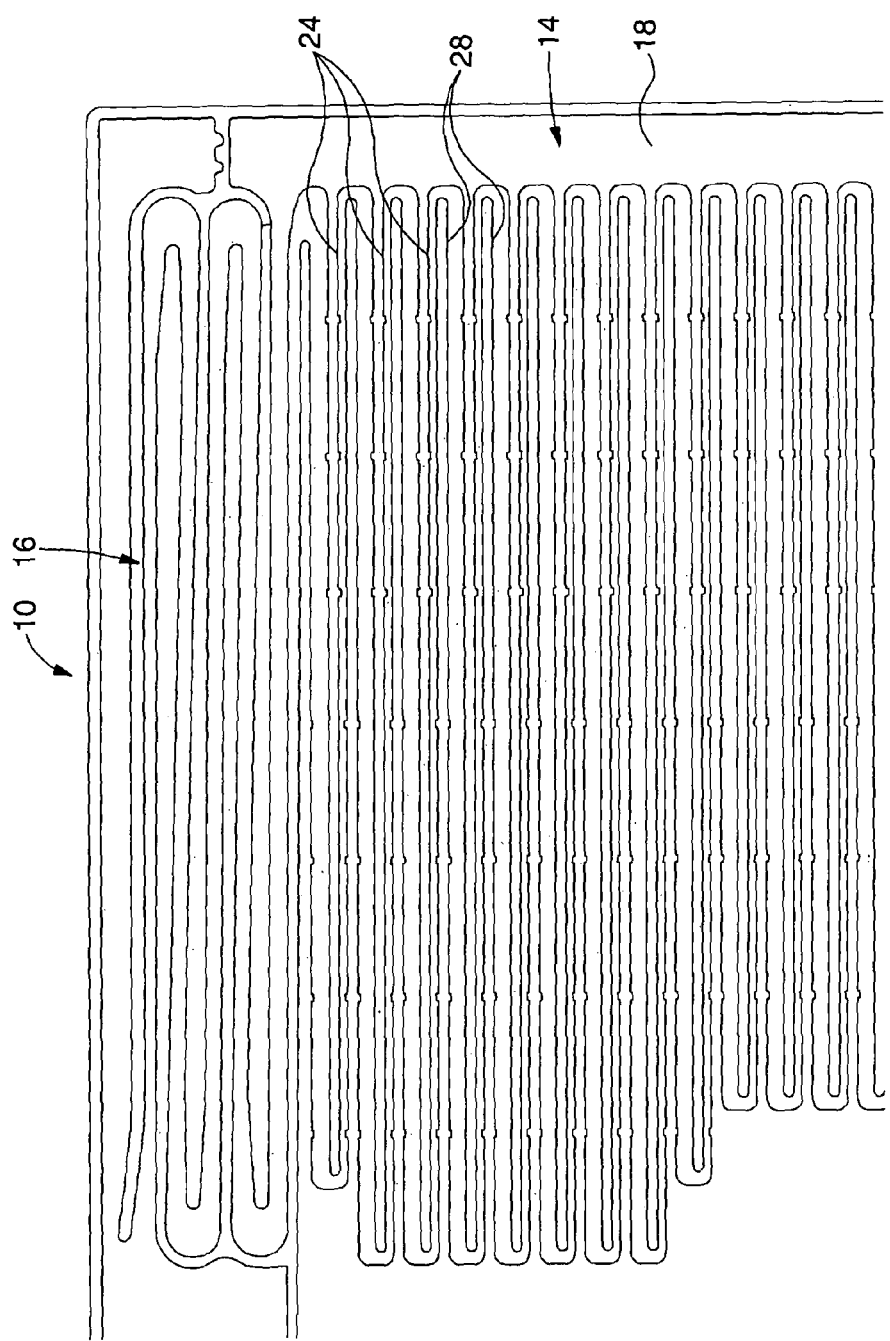
FIG. 1a is a plan view illustrating part of the embodiment of FIG. 1 to an enlarged scale.
Figure 2:
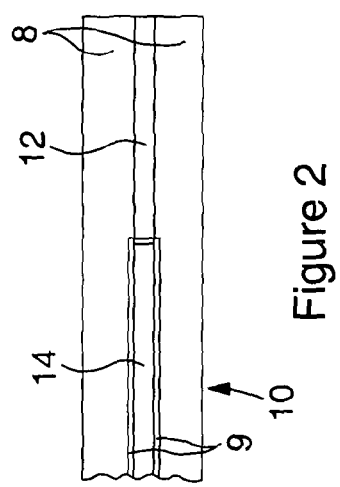
FIG. 2 is a side view of part of the accelerometer of FIG. 1 to an enlarged scale.
Figure 3:
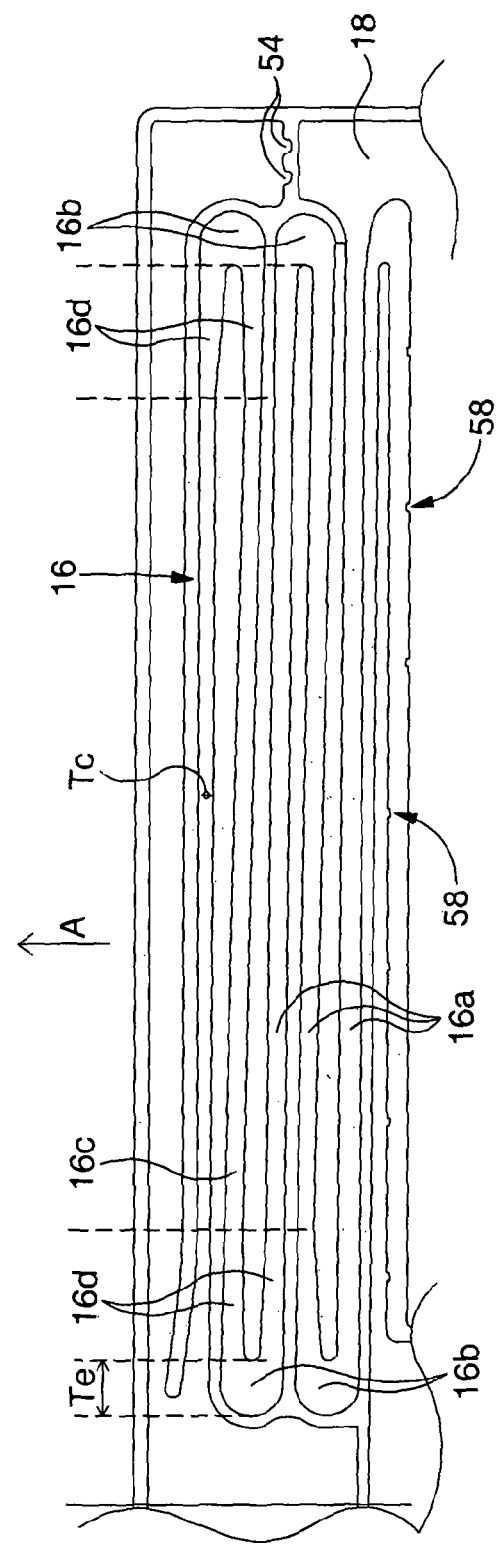
FIG. 3 is a plan view to an enlarged scale illustrating part of the accelerometer of FIG. 1.

Referring firstly to FIG. 2, an accelerometer 10 is illustrated comprising a support 12 to which a proof mass 14 is movably mounted by means of a series of mounting legs 16 (see FIGS. 1, 1a and 3). The proof mass 14, legs 16 and support 12 are formed integrally with one another and are substantially coplanar, for example being fabricated by appropriate etching or other processing of a silicon wafer. The support 12 and proof mass 14 are located or sandwiched between a pair of substrates 8 of glass or another suitable material. Shallow cavities 9 are formed in the substrates 8 at locations adjacent the proof mass 14 so that, in normal use, the proof mass 14 does not engage the substrates 8 and so is free to move.

The proof mass 14 is made up of a first mass element 18, connected to the support 12 by a pair of the mounting legs 16, and a second mass element 20 connected to the support 12 by another pair of the mounting legs 16. A connecting element in the form of a cross brace 22 interconnects the first and second mass elements 18, 20 in such a manner as to ensure that they move together, in unison, in use and so act as a single mass.

The mounting legs 16 are all of substantially the same form, and FIG. 3 illustrates one of the mounting legs 16 in greater detail. The mounting legs 16 apply a biasing load to the proof mass 14 urging the proof mass 14 towards a central, rest position. In use, if the accelerometer 10 is subject to an acceleration in a sensing direction (direction A as shown in FIG. 3), the inertia of the proof mass 14 will result in the proof mass 14 moving relative to the support 12, such movement being accommodated by deflection of the mounting legs 16, and taking place against the action of the restoring load applied by the resilience of the mounting legs 16 urging the proof mass 14 back towards its central position. The distance through which the proof mass 14 moves is related to the magnitude of the acceleration to which the accelerometer has been subject.

As shown in FIG. 3, each of the mounting legs 16 is of generally serpentine shape, comprising a plurality of elongate, generally straight sections 16a interconnected at their ends by generally U-shaped, curved end sections 16b. The end sections 16b are of increased thickness compared to the generally straight sections 16a. In the arrangement illustrated, each leg 16 includes five generally straight sections 16a. However, it will be appreciated that the invention is not restricted in this regard and that a wide range of other designs are possible without departing from the scope of the invention.

By providing mounting legs 16 of serpentine form, the resonant frequency of the device can be reduced compared to a typical arrangement having straight mounting legs as the overall length and flexibility of each mounting leg 16 is increased. In the arrangement illustrated the out-of-plane resonant frequency is in the region of 30-40 kHz. In the event of an out-of-plane acceleration being applied, the distance moved by the proof mass 14 is in the region of 1-2 nm/g. If the applied acceleration is significantly in excess of, for example, 10000 g, the approximately 20 µm distance moved by the proof mass of an arrangement with a resonant frequency of this order will be sufficient to bring the proof mass 14 into engagement with one of the adjacent substrates 8, the cooperation between the substrate 8 and the proof mass 14 serving to limit further movement of the proof mass 14 and so reducing the likelihood of damage thereto. Whilst the substrate 8 serves as a bump stop limiting out of plane movement of the proof mass 14, there is a need, in accordance with the invention, to design the mounting legs 16 in such a manner to avoid or limit damage thereto arise from out-of-plane stresses.

Each generally straight section 16a comprises a central part 16c of substantially uniform thickness. In the arrangement shown the central part 16c makes up approximately 75% of the overall length of the generally straight section 16a. However, this need not always be the case and other arrangements are possible, for example where the central part 16c makes up, for example, 50% or more of the overall length of the straight section, Likewise, arrangements where the central part 16c makes up a greater proportion of the overall length of the generally straight section 16a are possible.

To each end of the central part 16c are formed tapering regions 16d in which the thickness of the material of the leg 16 gradually increases, forming a smooth transition in thickness from the central part 16c of the generally straight section 16a to the end section 16b. As illustrated, the end section 16b is of thickness considerably greater than the thickness of the central part 16c. For example, the maximum thickness Te of the end section 16b may be at least twice the thickness Tc of the central part 16c. Indeed, it is conveniently greater than this, for example falling within the range 2.5 to 4 times the thickness Tc. In the arrangement shown it is in the region of 3 times the thickness Tc.

Although not apparent from the drawings, the central parts 16c of the generally straight sections 16a are conveniently not all of the same thickness.

As mentioned hereinbefore, it has been found that where a proof mass is supported by serpentine shaped legs and the device is subject to a large acceleration, certain parts of the legs are subject to greater stresses than other parts thereof. In particular, the end sections 16b are subject to greater stress loadings than the generally straight sections 16a. By increasing the thickness of the end sections 16b relative to that of the generally straight sections 16a a more uniform stressing of the legs 16 can be achieved, reducing the likelihood of failure. By providing tapering regions 16d rather than a sharp transmission in thickness, further enhancements in the uniformity of stress distribution can be achieved. Likewise, by tuning the thickness of the central part 16c of each generally straight section 16a to the applied stresses, a more uniform stress distribution can be achieved.

It will be appreciated that increasing the thickness of the mounting legs 16 or parts thereof will increase the stiffness of the mounting legs 16 and so could undesirably reduce the sensitivity of the device to in-plane accelerations. As the use of serpentine shaped legs is intended to increase sensitivity, care must be taken in determining which parts of the legs to increase the thickness of, and in determining by how much to increase the thickness thereof so as to achieve a good balance between sensitivity and strength.

As shown, the first mass element 18 and second mass element 20 are spaced apart from one another, and the support 12 extends into the space therebetween. The brace 22 also extends across this space, and the support 12 is shaped to include a break through which the brace 22 extends so that the proof mass 14 is free to move relative to the support 12. The support 12 thus takes the form of an upper support part 12a and a lower support part 12b, separated by the aforementioned break.

As shown in FIGS. 1 and 1a, the first mass element 18 carries upper and lower groups 24, 26 of movable capacitor fingers, each finger extending substantially parallel to the straight sections 16a of the mounting legs 16 and so substantially perpendicular to the direction A which the proof mass 14 is able to move. The term 'movable' is used to indicate that the fingers are able to move relative to the support 12 by virtue of the fact that they are provided on the proof mass which is, itself, movable relative to the support 12, not to suggest that the individual fingers are able to move relative to the proof mass 14. The support 12 has associated therewith a first pair of upper and lower groups 28, 30 of fixed capacitor fingers. The fingers of the upper group 28 are interdigitated with those of the upper group 24, and the fingers of the lower group 30 are interdigitated with those of the lower group 26. Similarly, the second mass element 20 is provided with upper and lower groups 32, 34 of movable capacitor fingers, interdigitated with a second pair of upper and lower groups 36, 38 of fixed capacitor fingers associated with the support 12. The first and second upper groups 28, 36 are associated with the upper part 12a of the support 12 and the first and second lower groups 30, 38 are associated with the lower part 12b of the support 12. As can be seen in FIG. 1, the fingers of each interdigitated pair of groups are not equally spaced. In each case, the fixed fingers of each of the groups 28, 30, 36, 38 associated with the support 12 lie closer to the adjacent moveable finger nearest the brace 22 than it does to the adjacent movable finger more remote from the brace 22, when the proof mass 14 occupies its central, rest position. However, arrangements may be possible in which this is reversed.

In use, if the accelerometer 10 is subject to an acceleration in the sensing direction resulting in an upward movement of the proof mass 14 relative to the support 12, in the orientation shown in FIG. 1, this will result in the spacing between the closest ones of the fingers of upper groups 24, 28, 32, 36 reducing whilst the spacing between the closest ones of the fingers of the lower groups 26, 30, 34, 38 will increase by an equal amount. It will be appreciated that the change in spacing of the fingers results in the capacitance therebetween also changing, and by appropriate monitoring of the differential capacitance, an output can be achieved that provides an indication of the position of the proof mass 14 relative to the support 12. As the position occupied by the proof mass 14 is related to the magnitude of an applied acceleration, it will be appreciated that by monitoring of the capacitance, an indication of the magnitude of the applied acceleration can be output.

The manner in which the capacitance is monitored is conveniently substantially as described in U.S. Pat. No. 7,047,808, that is to say that a, for example, square wave drive voltage is preferably applied to the first and second upper groups 28, 36 of fixed fingers associated with the support 12 whilst a similar, but anti-phase, square wave drive signal is applied to the first and second lower groups 30, 38 of fixed fingers. By appropriate monitoring and processing of a signal derived from the groups of movable fingers mounted upon the proof mass 14, an output indicative of the applied acceleration can be achieved. The output may be derived either using an open loop type configuration or in a closed loop manner. As the manner by which the capacitance is monitored is largely in accordance with known techniques, for example as described in U.S. Pat. No. 7,047,808, it will not be described herein in further detail. It should be noted that other techniques may be used to monitor the output of the device without departing from the scope of the invention.

As shown in FIG. 1, the accelerometer 10 conveniently forms part of a larger accelerometer device 52 made up of two accelerometers 10 located adjacent one another and orientated such that the sensing directions thereof are perpendicular to one another. If desired, the substrates 8 may be common to both accelerometers 10.

An accelerometer device 52 of this form allows accelerations in two perpendicular directions or axes to be monitored.

As mentioned hereinbefore, it is desirable for the accelerometer 10 to be able to withstand significant accelerations without sustaining damage thereto. In the arrangement described hereinbefore, a very large acceleration in the sensing direction would result in an end part of each of the first and second mass elements 18, 20 butting against an adjacent part of the support 12. Such contact would occur before contact is made between adjacent ones of the interdigitated fingers, and so the risk of damage thereto, or stiction between the fingers occurring is low. As shown in FIG. 3, the part of the support 12 which can contact the mass elements 18, 20 in such circumstances is electrically connected to, and so is at the same potential as, the mass elements 18, 20 so such contact does not result in temporary shorting the proof mass 14 to ground. As shown, a pair of fixed stop members 54 is conveniently provided on the support 12 to limit the movement of the mass elements 18, 20. The provision of two such members 54 ensures that the required loadings can be borne without introducing unnecessary complexity into the etching of the device.

Despite the provision of the bump stops 54, the flexibility of the fingers could result in contact therebetween. In case the fingers do come into contact with one another, the fingers may be provided with small pips 58 so that contact between substantially the entire surfaces thereof can be avoided, and so the risk of stiction therebetween is reduced.

Out-of-plane loadings or accelerations are withstood by a combination of the cooperation between the proof mass 14 and the adjacent substrate 8 acting as a bump stop, achieved by virtue of the use of the serpentine shaped legs 16 to allow sufficient movement of the proof mass 14 to permit such engagement, and by the design of the mounting legs 16 being such that large loadings can be accommodated without damage thereto, in part due to the relatively uniform distribution of stress therein.

Whilst one embodiment of the invention is described herein, it will be appreciated that a wide range of modifications and alterations could be made to the design of the accelerometer without departing from the scope of the invention.

The invention claimed is:

1. An accelerometer comprising a support, a proof mass supported for movement relative to the support by a plurality of mounting legs, a plurality of fixed capacitor fingers associated with the support and a plurality of movable capacitor fingers associated with the proof mass, the fixed capacitor fingers being interdigitated with the movable capacitor fingers, the mounting legs being of serpentine shape, each mounting leg comprising at least a first generally straight section, a second generally straight section, and an end section of generally U-shaped form interconnecting the first and second generally straight sections, wherein the thickness of the end section is greater than the thickness of a central part of both of the first and second generally straight sections, wherein each straight section includes a tapering part at each end thereof.

2. An accelerometer as claimed in claim 1, wherein the maximum thickness of the end section is at least twice the thickness of the central parts.

3. An accelerometer as claimed in claim 2, wherein the maximum thickness of the end section is at least 2.5 times the thickness of the central parts.

4. An accelerometer as claimed in claim 2, wherein the maximum thickness of the end section is less than four times the thickness of the central parts.

5. An accelerometer as claimed in claim 4, wherein the maximum thickness of the end section is about three times the thickness of the central parts.

6. An accelerometer as claimed in claim 1, wherein the tapering part provides a smooth transition between the thickness of the generally straight sections and that of the end section.

7. An accelerometer as claimed in claim 1, wherein the end section is of smoothly curved form.

8. An accelerometer as claimed in claim 1, wherein the thickness of the central part of the first generally straight section is different to that of the central part of the second generally straight section.

9. An accelerometer as claimed in claim 1, wherein each leg includes five generally straight sections.

10. An accelerometer as claimed in claim 1, wherein the central part of each generally straight section is of uniform thickness.

11. An accelerometer as claimed in claim 10, wherein the central part forms at least 50% of the length of each generally straight section.

12. An accelerometer as claimed in claim 11, wherein the central part forms at least 65% of the length of each generally straight section.

13. An accelerometer as claimed in claim 1, wherein the central part forms less than 85% of the length of each generally straight section.

14. An accelerometer as claimed in claim 1, wherein the proof mass comprises a first proof mass element and a second proof mass element, the first and second proof mass elements being rigidly interconnected by a connecting member, and wherein the fixed capacitor fingers are located between the first and second proof mass elements.

15. An accelerometer as claimed in claim 1, further comprising bump stop means to limit movement of the proof mass in a sensing direction.

16. An accelerometer as claimed in claim 15, wherein each bump stop means comprises a pair of bump stops.

17. An accelerometer as claimed in claim 16, wherein the pair of bump stops is provided upon the support.

* * * * *